United States Patent [19]
Kaneko et al.

[11] Patent Number: 5,399,826
[45] Date of Patent: Mar. 21, 1995

[54] ELECTRIC DISCHARGE MACHINING APPARATUS

[75] Inventors: Yuji Kaneko; Shinji Ito, both of Yokohama; Satoru Tajima, Fujui, all of Japan

[73] Assignee: Sodick Co., Ltd., Yokohama, Japan

[21] Appl. No.: 53,829

[22] Filed: Apr. 29, 1993

Related U.S. Application Data

[63] Continuation of Ser. No. 921,058, Jul. 29, 1992, abandoned.

[30] Foreign Application Priority Data

Jul. 29, 1991 [JP] Japan .................................. 3-188980

[51] Int. Cl.⁶ .................................................. B23H 1/02
[52] U.S. Cl. ............................ 219/69.13; 219/69.18; 219/69.19
[58] Field of Search ................ 219/69.13, 69.18, 69.19

[56] References Cited

U.S. PATENT DOCUMENTS

| | | | |
|---|---|---|---|
| 3,597,570 | 8/1971 | Saito et al. | 219/69.18 |
| 3,739,136 | 6/1973 | Marendaz | 219/69.13 |
| 3,812,317 | 5/1974 | De Bont et al. | 219/69.18 |
| 3,860,779 | 1/1975 | Marendaz | 219/69.13 |
| 3,875,374 | 4/1975 | Inoue | 219/69.16 |
| 4,453,069 | 6/1984 | Inoue | 219/69.18 |
| 4,504,722 | 3/1985 | Kishi et al. | 219/69.18 |
| 4,700,038 | 10/1987 | Dauw | 219/69.18 |
| 5,023,421 | 6/1991 | Bouchoud | 219/69.13 |

FOREIGN PATENT DOCUMENTS 2171822  2/1988  United Kingdom .

Primary Examiner—Geoffrey S. Evans
Attorney, Agent, or Firm—Marks & Murase

[57] ABSTRACT

An electric discharge machining apparatus has a pair of carbide formation detectors for minimizing carbide formation and for preventing abnormal discharges from occurring across the machining gap. If the discharge voltage is below a lower reference voltage for a predetermined period of time and for a predetermined number of ON/OFF cycles, then the first detector compares the discharge voltage with a higher voltage level. When the discharge voltage is greater than the higher level for a predetermined period of time and for a predetermined number of ON/OFF cycles, the first carbide detector generates an ARC STOP signal for halting the machining operation. A second carbide formation detector will generate an ARC STOP signal for halting the machining operation when the discharge waiting time is less than a predetermined period of time for a predetermined number of cycles. By having the two carbide formation detectors, abnormal discharges such as concentrated arc discharges and continuous arcing discharges are prevented. Also, machining efficiency is improved since operator supervision for detecting carbide formation is no longer necessary.

10 Claims, 12 Drawing Sheets

ELECTRIC DISCHARGE MACHINING APPARATUS

This application is a continuation of application Ser. No. 07/921,058, filed Jul. 29, 1992, now abandoned.

BACKGROUND OF INVENTION

1. Field of the Invention

This invention generally relates to an electric discharge machining apparatus for controlling electrical discharges across the gap and, more particularly, to an apparatus for preventing abnormal discharges.

2. Description of Prior Art

In general, an electrical discharge between a workpiece and an electrode results in the removal of a small crater of material from the workpiece. Electric discharge machining may be performed by the application of a plurality of electrical discharges in a highly repetitive manner. The spacing between the electrode and the workpiece, called the gap, is typically on the order of a few microns, or tens of microns, and is typically filled with a dielectric machining liquid, such as water or kerosene. The pulses of current have a nearly constant peak current value and constant pulse width having an ON state and an OFF state for the predetermined machining condition.

In order to induce optimal electric discharge machining, the pulse-like discharges of current must be optimally controlled in accordance with the material and hardness of the workpiece and the discharge condition at the gap. The discharges across the gap must be optimally controlled in order to prevent abnormal discharges, such as a concentrated electric discharge, which could cause an undesirable large crater on the surface of the workpiece, or a continuous arc discharge, which could damage either the workpiece or the electrode by causing arc scars, from occurring at the gap. Control of the discharges is performed by having a controller supply pulsed 10 electrical power to the gap based on a detected discharge voltage at the gap or a discharge current at the gap.

Although the occurrences of abnormal discharges across the gap may be prevented by optimally controlling the discharges, such optimal control is dependent upon various factors, such as the flushing condition and the shape of the workpiece. Optimal control is also dependent upon use of an electrode jump function a function, in which the electrode moves up and away from the workpiece and then immediately returns down to a position close to the workpiece. Because of these and other varying factors, carbide formation may still occur at the gap even with so-called optimal control of the discharges. The carbide formation may hinder the progress of machining and arc scars may damage the workpiece or the electrode due to continuous arc discharges.

Thus, in order to prevent carbide formation, an operator typically must visually observe the machining and, if carbide formation is detected, the electric discharge machining would be halted. The detection of the carbide formation, however, is dependent upon the ability and skill of the operator to detect the carbide formations. Thus, some operators may not halt machining until the carbide has formed and the discharges have deteriorated into continuous arc discharges. At the this stage, the electrode and the workpiece may already be damaged by arc scars. On the other hand, other operators may halt the machining before any carbide has formed which would endure frequent stopping of the machining operation, thereby increasing the machining time and decreasing the machining efficiency,

SUMMARY OF THE INVENTION

It is an object of the present invention to provide an electric discharge machining apparatus and method which can overcome the disadvantages of the prior art.

It is another object of the present invention to provide an electric discharge machining apparatus and method which can accurately detect the formation of carbide.

It is yet another object of the present invention to provide an electric discharge machining apparatus and method which can efficiently prevent abnormal discharges from occurring at the gap.

It is still a further object of the present invention to provide an electric discharge machining apparatus and method which can minimize the damage to the electrode and to the workpiece due to abnormal discharges.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, an electric discharge machining apparatus comprises a pair of detectors for detecting carbide formation and for stopping the supply of electrical power to the gap. The first detector detects the formation of carbide by comparing a discharge voltage with a pair of reference voltages and the second detector detects the formation of carbide by counting the number of discharge pulses having a discharge waiting time less than a predetermined time period. The first detector is effective when the machining is performed with copper or graphite electrodes while the second detector is effective when copper tungsten is used as an electrode.

Furthermore, the first detector may also include of a precursor phenomenon detector. With the precursor phenomenon detector, the first carbide detector determines whether the discharge voltage has been less than a lower reference level for a predetermined period of time and for a predetermined number of cycles. If so, then the first carbide detector compares the discharge voltage with a higher voltage level. If the discharge voltage becomes greater than the higher level for a predetermined period of time and for a predetermined number of cycles, then the supply of power is removed from the gap.

BRIEF DESCRIPTION OF THE DRAWINGS

The accompanying drawings, which are incorporated in, and form a part of the specification, illustrate an embodiment of the present invention and, together with the description, serve to explain the principles of the invention. In the drawings.

DETAILED DESCRIPTION OF THE PREFERRED EMBODIMENT

Reference will now be made in detail to a preferred embodiment of the invention, an example of which is illustrated in the accompanying drawings.

Figure 1:
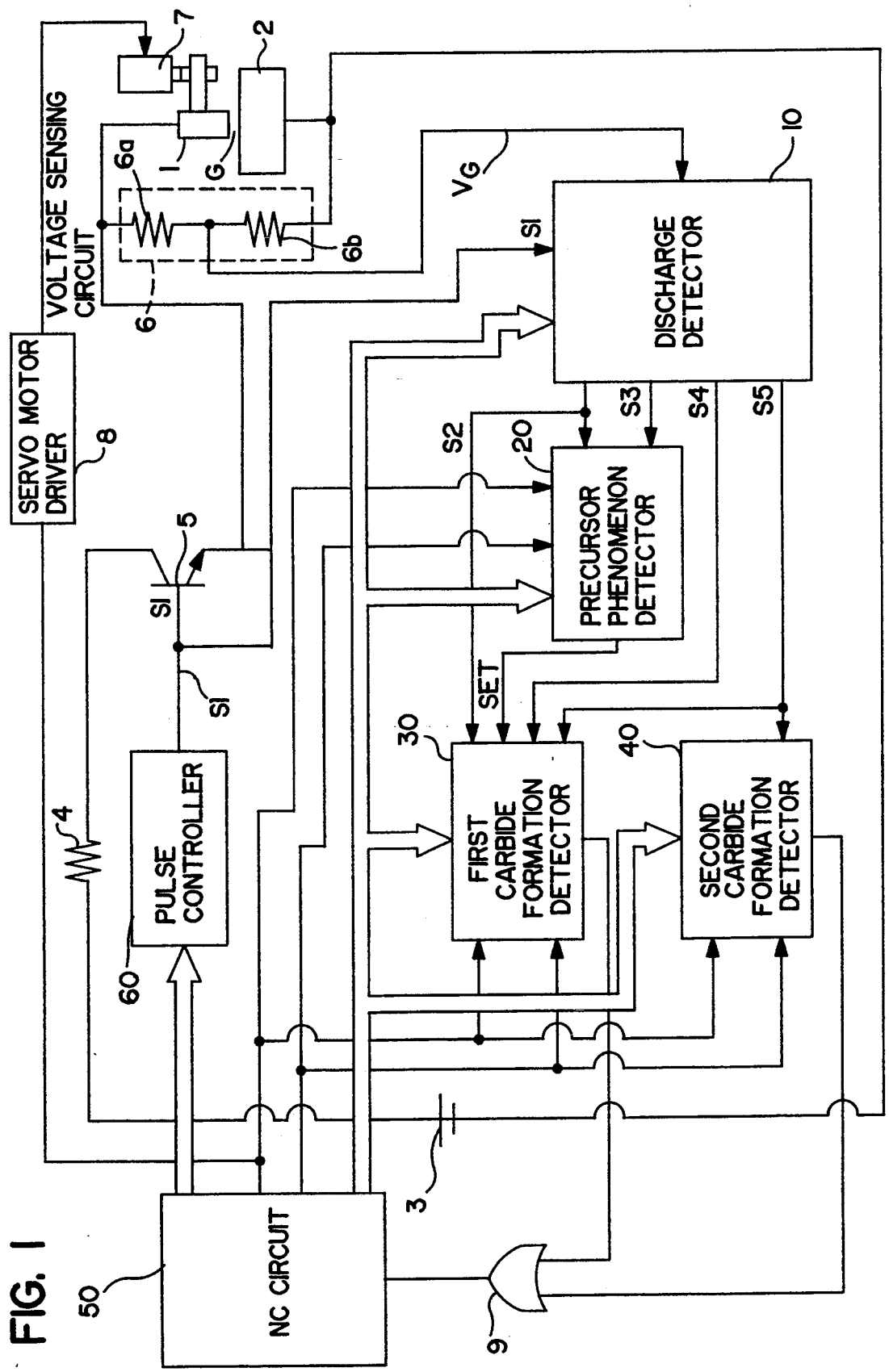
FIG. 1 is a block diagram of an embodiment of the invention.

As shown in FIG. 1, a wire-cut electric discharge machining (EDM) apparatus comprises a machining electrode 1 connected to an arm unit and spaced at a distance, called the gap G, from a workpiece 2. The workpiece 2 is preferably attached to a mounting table and submerged within a processing tank filled with a machining fluid, such as kerosene or water.

The anode of a power source 3 is connected to the electrode 1 through a power limiting resistor 4 and a switching element 5 while the cathode of the power source 3 is connected to the workpiece 2 and to the processing tank. A pulse controller 60 generates a gate signal S1 based upon a control signal from a numerical controller (NC) circuit 50, which generates the gate signal S1 as well as a plurality of other control signals according to a preset program. The gate signal S1 turns the switching element 5 ON and OFF for pulsing a supply of current from the power source 3 to the electrode 1.

Under the control of the NC circuit 50, a servo driver 8 controls a servo motor 7 to thereby control the positioning of the arm unit and the electrode 1 relative to the workpiece 2. Among other functions, the NC circuit 50 causes the electrode 1 to perform a jump function when it is necessary to remove particles produced during machining from the gap G. To perform a jump function, the electrode 1 is moved up and away from the workpiece 2 and is then immediately returned back to a position close to the workpiece 2.

The NC circuit 50 also commands the servo driver 8 to move the electrode 1 in order to perform a series of electric discharge machining operations. The servo motor 7 and arm unit may move the electrode 1 according to preset programs stored in the NC circuit 50 so that a variety of electric discharge machining operations may be performed on the workpiece 2.

A voltage sensing circuit 6 is preferably comprised of a voltage divider having resistances 6a and 6b which are connected across the electrode 1 and the workpiece 2. A proportion of the voltage detected across the resistance 6b is input to a discharge detector 10 as a gap voltage $V_G$.

The discharge detector 10 determines the condition of the gap G by processing the gap voltage $V_G$ received from the voltage sensing circuit 6, the gate signal S1 received from the pulse controller 60, and control signals from the NC circuit 50.. According to the signal processing, the discharge detector 10 generates a discharge state signal S2, a low level clock signal S3, a high level clock signal S4, and an infinitesimal discharge waiting time signal S5.

The precursor phenomenon detector 20 detects carbide formation on the workpiece 2 or electrode 1 from the discharge state signal S2, the low level clock signal S3, a jump command signal from NC circuit 50, and a timer signal from NC circuit 50. The timer signal is supplied from the NC circuit 50 when normal electric discharge machining occurs throughout a predetermined time period. From the processing of these signals, the precursor phenomenon detector 20 supplies the first carbide formation detector 30 with a SET signal.

Besides receiving the SET signal, the first carbide formation detector 30 also receives the discharge state signal S2, the high level clock signal S4, the infinitesimal discharge waiting time signal S5, the jump command signal, and the timer signal. If the first carbide formation detector 30 determines that a continuous arc discharge is likely to occur based upon the received signals, then the first carbide formation detector 30 generates an ARC STOP signal which is sent through a first input of an OR gate 9 to the NC circuit 50 for stopping the discharge machining operation.

The second carbide formation detector 40 determines whether a continuous arc is likely to occur based upon the jump command signal, the timer signal, and the infinitesimal discharge waiting time signal S5. When the second carbide detector 40 does determine that a continuous arc is likely to occur, the second carbide detector 40 generates an ARC STOP signal which is supplied to the NC circuit 50 through a second input of the OR gate 9. Thus, either the first carbide formation detector 30 or the second carbide formation detector 40 may produce an ARC STOP signal for halting the machining operation.

Figure 2:
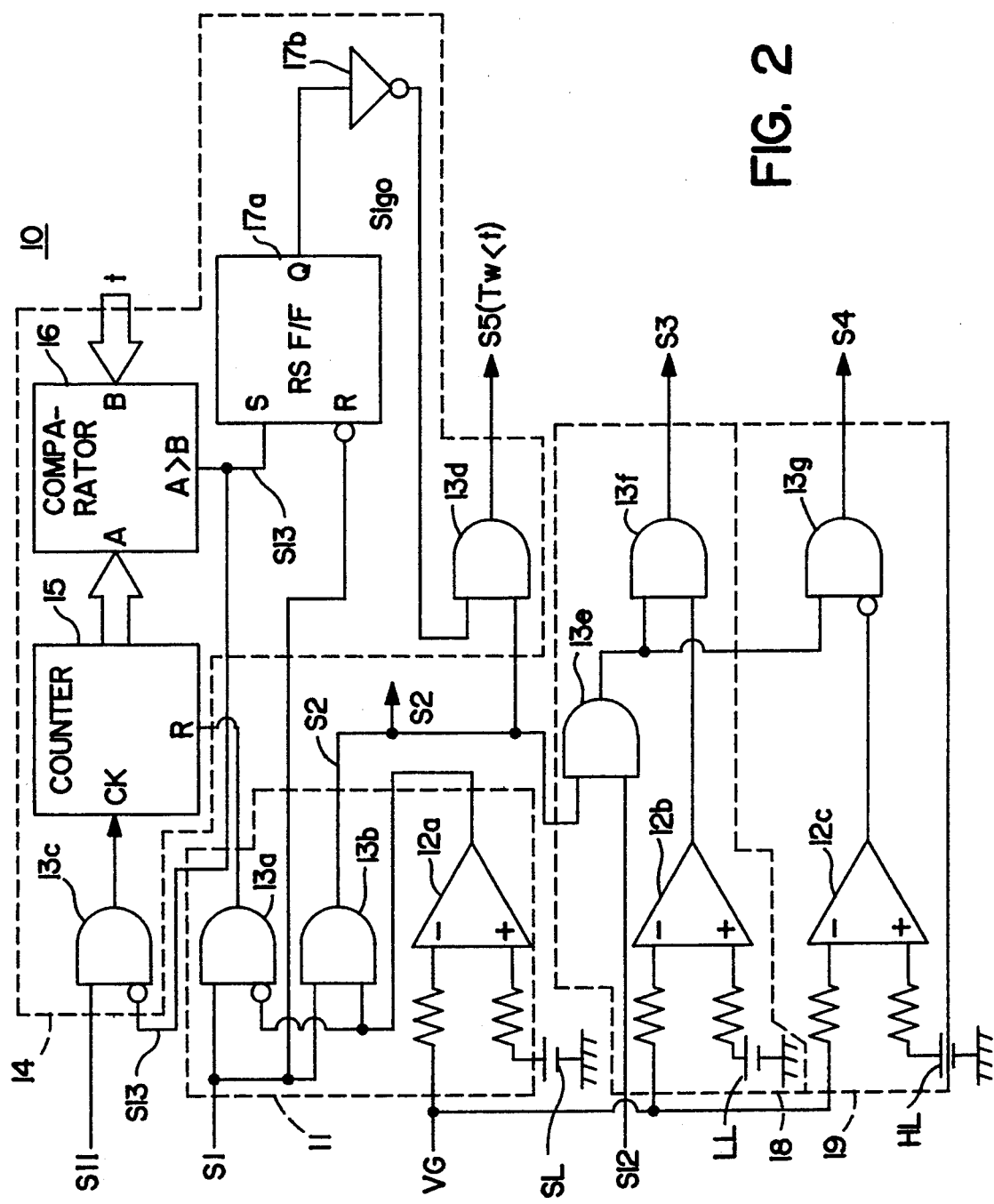
FIG. 2 is a block diagram of a discharge detector for the embodiment of FIG. 1.

As depicted in FIG. 2, the discharge detector 10 may be divided into four blocks: a first block 14, a second block 11, a third block 18, and a fourth block 19. A comparator 12a in the block 11 compares the gap voltage $V_G$ with a spark level voltage SL and outputs a signal having a low level only when the gap voltage $V_G$ is greater than the spark level SL. The output of the comparator 12a is supplied to an inverted input of AND gate 13a and to an input of AND gate 13b.

The other input of AND gate 13a receives the gate signal S1. The output Tw of AND gate 13a is representative of a discharge waiting time period, as shown in FIG. 3(c), and is supplied to a reset terminal R of a counter 15. As shown in FIGS. 3(a) and 3(c), the signal Tw will go high and will thus reset the counter 15 when the gap voltage $V_G$ is above the spark level SL and the gate signal S1 is high.

The AND gate 13b also receives the gate signal S1 at its other input. The output of AND gate 13b forms the discharge state signal S2 and, as shown in FIGS. 3(a) and 3(e), goes high when the gap voltage $V_G$ is below the spark level SL while the gate signal S1 is high. The discharge state signal S2 is sent to an input terminal of AND gates 13d and 13e, to the precursor phenomenon detector 20, and to the first carbide formation detector 30.

Figure 3:
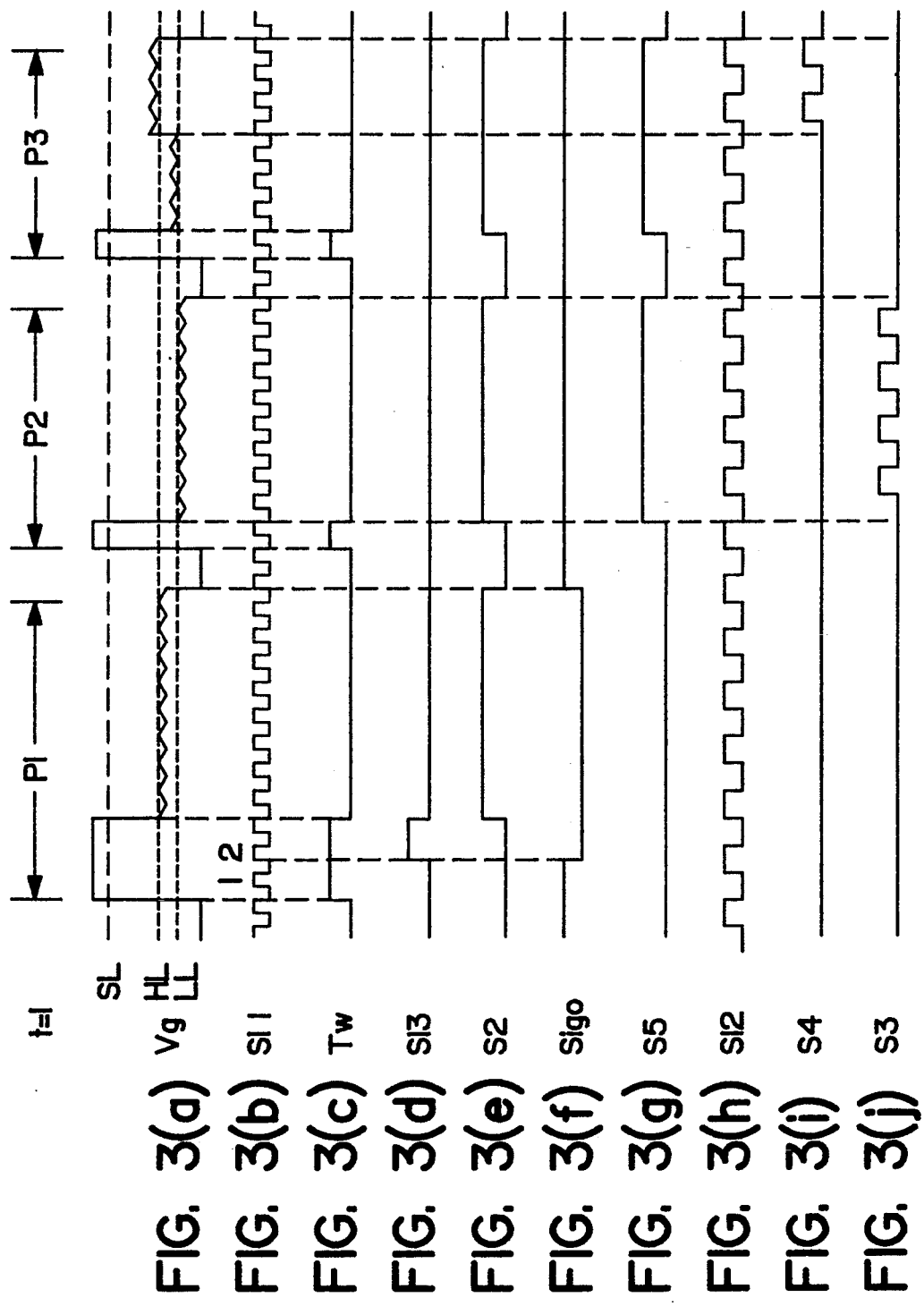
FIGS. 3(a) to 3(j) are a timing chart for the discharge detector of FIG. 2.

A first clock signal S11 having a certain frequency is supplied to an input terminal of AND gate 13c, which passes the clock signal S11 to a clock input CK of the counter 15 only when a signal S13, shown in FIG. 3(d), is low. The counter 15 counts the pulses from the first clock signal S11 and supplies the count to an A input terminal of a comparator 16. The comparator 16 compares the count to a reference time value t applied to its B input terminal from the NC circuit 50. For example, as shown in FIG. 3, the NC circuit 50 sets the value of t equal to 1. When the count supplied to terminal A is greater than the time period t supplied to terminal B, the output signal S13 of comparator 16 goes high.

Thus, the counter 15 counts the pulses from the first clock signal S11 only during the discharge waiting time period indicated by signal Tw and the comparator 16 determines if the discharge waiting time period Tw is greater than a reference time period t. In other words, each time the gap voltage. $V_G$ rises above the spark level SL while a gate signal S1 is high, the counter 15 is reset so that the comparator 16 can determine whether the gap voltage $V_G$ is above the spark level SL for longer than the time period t. During the discharge waiting time period Tw, the gap G is in a no-load voltage state since no current is flowing through the gap G.

The output signal S13 from comparator 16 is sent to a set terminal S of RS flip-flop 17a for setting the RS flip-flop when the discharge waiting time period Tw is greater than the reference time period t. The Q output of RS flip-flop 17a will therefore go high when the discharge waiting time period Tw is greater than, for example when t is equal to 1, 1 cycle of the first clock signal S11. The RS flip-flop 17a has an inverted reset terminal R connected to the gate signal S1 for resetting the RS flip-flop 17a each time the gate signal S1 goes high.

The Q output of the RS flip-flop 17a is passed through an inverter 17b and supplied to an input of AND gate 13d, which has its other input supplied with the discharge state signal S2. As shown in FIGS. 3(e), 3(f), and 3(g), the AND gate 13d passes the discharge state signal S2 as its output signal S5, which is the infinitesimal discharge waiting time signal S5, only when the output of the inverter 17b, or signal Sigo, is at a high level. Therefore, the infinitesimal discharge waiting time signal S5 goes high during the discharging state and when the discharge waiting time period Tw is not greater than the reference time period t. As shown in FIGS. 3(a) to 3(j), the infinitesimal discharge waiting time signal S5 is low during time period P1 and high during time periods P2 and P3.

A comparator 12b compares the gap voltage $V_G$ with a lower reference discharge voltage level LL and generates an output signal which is low only when the gap voltage $V_G$ is above the lower level LL. The output of comparator 12b is supplied to a first input of AND gate 13f. An AND gate 13e passes a second clock signal S12, which has a frequency lower than that of the first clock signal S11, to the other input of AND gate 13f when the discharge state signal S2 is high. Thus, as shown in FIGS. 3(a), 3(e), (h), and (j), the low level clock signal S3 is generated by AND gate 13f only when the gap voltage $V_G$ is below the lower level LL while the discharge state signal S2 is high. The low level clock signal S3 is then sent to the precursor phenomenon detector 20.

A comparator 12c compares the gap voltage $V_G$ with a higher reference discharge voltage level HL and generates a high output as long as the gap voltage $V_G$ is below the higher level HL. The output of comparator 12c is sent to an inverted input of AND gate 13g, which receives the output of AND gate 13e at its other input. As shown in FIGS. 3(a), (e), (h), and (i), the high level clock signal S4 is produced only when the gap voltage $V_G$ is above the higher level HL while the discharge state signal S2 is high. The high level clock signal S4 is sent to the first carbide formation detector 30.

Figure 4:
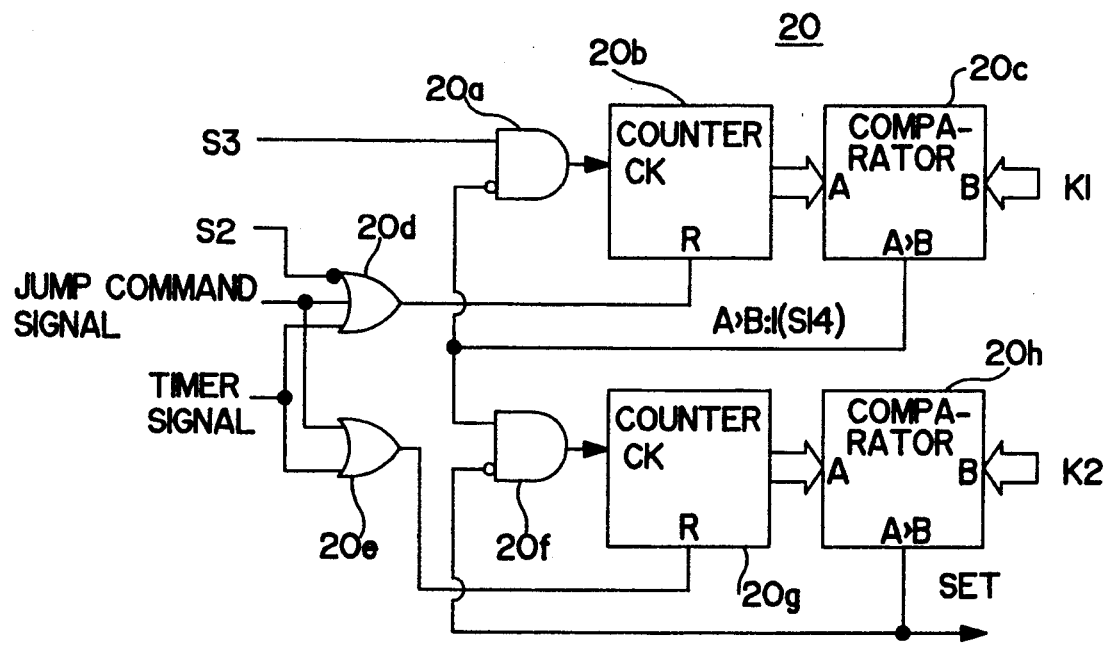
FIG. 4 is a block diagram of a precursor phenomenon detector for the embodiment of FIG. 1.

As shown in FIG. 4, the precursor phenomenon detector 20 may comprise an AND gate 20a which passes the low level clock signal S3 as its output when a signal S14 is low. The low level clock signal S3, the output of AND gate 20a, and the signal S14 are respectively illustrated as FIGS. 5(a), 5(b), and 5(c). The AND gate 20a supplies its output to a clock input CK of a counter 20b. The counter 20b counts the pulses from the low level clock signal S3 and supplies the count to an A input terminal of a comparator 20c. The counter 20b has its reset terminal R connected to the output of OR gate 20d so that the counter 20b is reset whenever any one of a discharge state signal S2, a jump command signal, or a timer signal goes high.

The comparator 20c compares the count at its A input terminal with a first reference value K1 supplied to its B input terminal from the NC circuit 50. When the number of pulses from the low level clock signal S3 becomes greater than the first reference value K1, the output signal S14 of comparator 20c goes high. With signal S14 at a high level, the AND gate 20a blocks the passage of pulses of the low level clock signal S3 to the counter 20b.

Figure 5:
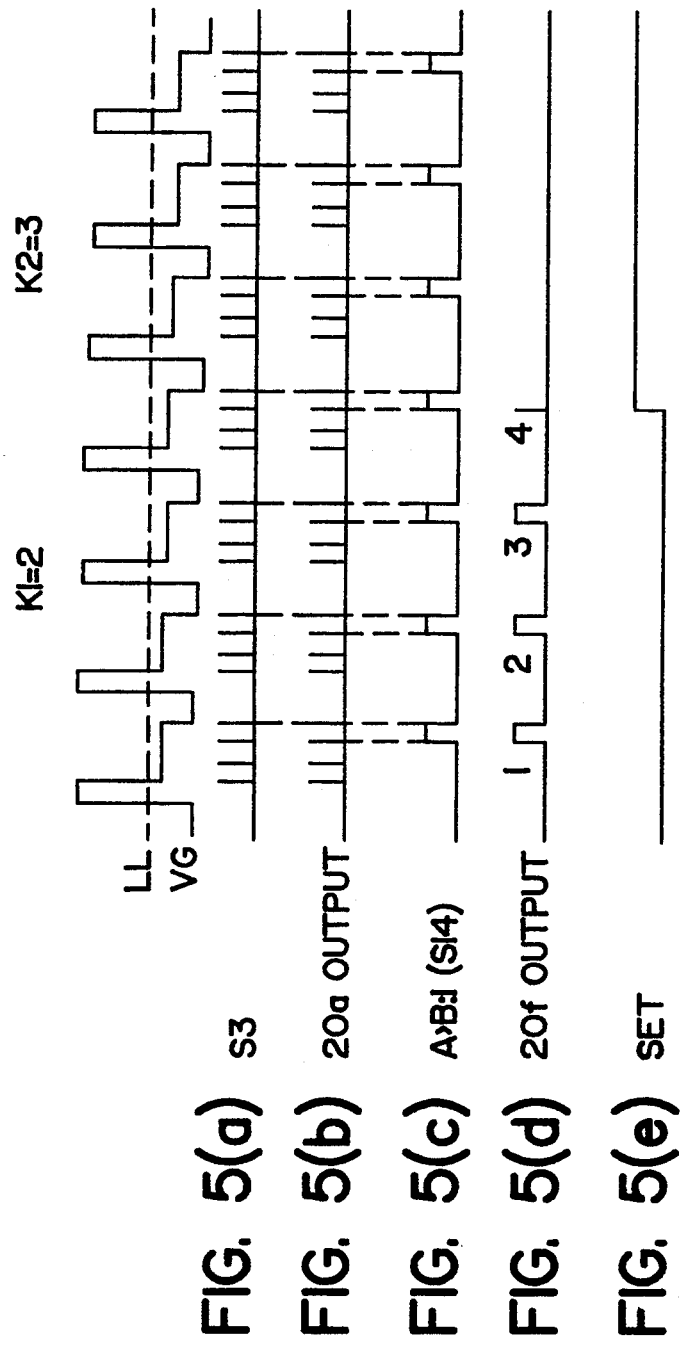
FIGS. 5(a) to 5(e) are a timing chart for the precursor phenomenon detector of FIG. 4.

The output signal S14 of comparator 20c is also supplied to an input of AND gate 20f, which has its output, FIG. 5(d), connected to a clock input CK of counter 20g. The counter 20g counts the number of times the signal S14 goes high and supplies the count to an A input terminal of a comparator 20h. The counter 20g has its reset terminal R connected to the output of OR gate 20e so that when either the timer signal or the jump command signal goes high, the counter 20g is reset.

The comparator 20h generates a high level output signal having a high level when the count from counter 20g is larger than a second reference value K2 supplied from the NC circuit 50. The output from comparator 20h, or the SET signal, is sent to an inverted input of AND gate 20f. Thus, once the count from counter 20g exceeds the second reference value K2, the AND gate 20f blocks signal S14 from passing through to the counter 20g.

In the example of FIGS. 5(a) to 5(e), K1 is equal to 2 and K2 is equal to 3. Therefore, each time the number of pulses on the low level clock signal S3 exceeds 2 (K1), the comparator 20c generates a high output signal S14. Then, when the number of times signal S14 goes high exceeds 3 (K2), the comparator 20h generates a high level SET signal.

Figure 6:
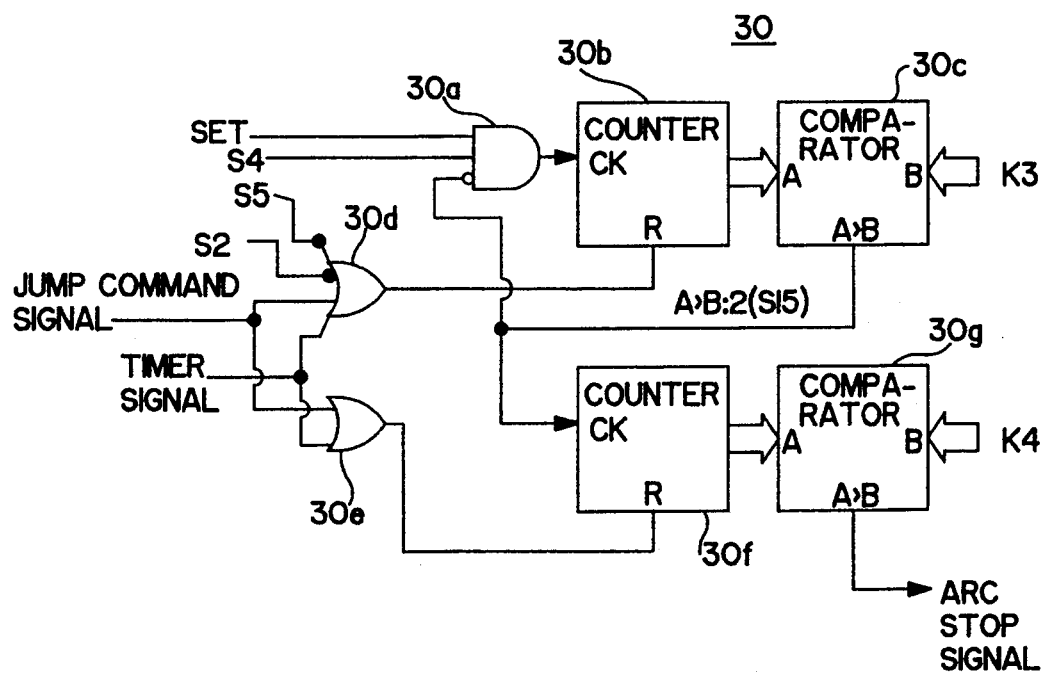
FIG. 6 is a block diagram of a first carbide 10 formation detector for the embodiment of FIG. 1.

As shown in FIG. 6, the first carbide formation detector 30 may comprise an AND gate 30a for receiving the SET signal, the high level clock signal S4, and an inverted signal S15 at its three inputs. The AND gate 30a passes the high level clock signal S4 through to a clock input CK of a counter 30b when the SET signal is high and when signal S15 is low. The counter 30b supplies the number of pulses of the high level clock signal S4 to an A input terminal of a comparator 30c. The counter 30b has its reset terminal R connected to the output of OR gate 30d so that the counter 30b is reset when any one of the infinitesimal discharge waiting time signal S5, the discharge state signal S2, the jump command signal, or the timer signal goes high.

The comparator 30c generates a high level output signal S15 when the count from counter 30b becomes greater than a third reference value K3, which is supplied to its B input terminal from NC circuit 50. When output signal S15 goes high, the AND gate 30a blocks the passage of the high level clock signal S4 to the counter 30b.

The output signal S15 is also sent to a clock input CK of counter 30f, which supplies its count to an A input terminal of a comparator 30g. The counter 30f has its reset terminal R connected to the output of OR gate 30e so that the count is reset each time either the timer signal or the jump command signal goes high. The comparator 30g outputs a high level ARC STOP signal when the count from counter 30f exceeds a fourth reference value K4, which is supplied to its B input terminal from NC circuit 50.

Figure 7:
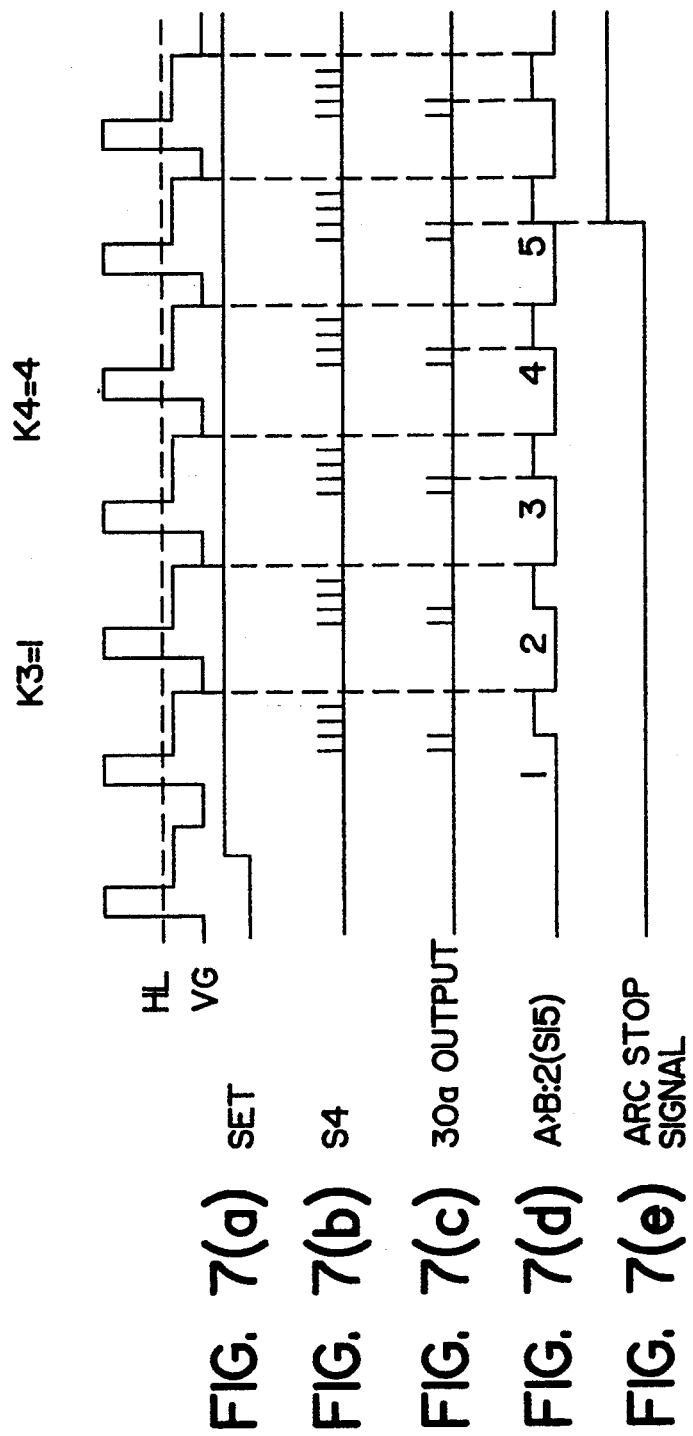
FIGS. 7(a) to 7(e) are a timing chart for the first carbide formation detector of FIG. 6.

In the example shown in FIGS. 7(a) to 7(e), the value of K3 is set to a small value, for example to 1, since the carbide quickly forms when the gap voltage $V_G$ is above the higher reference level HL. Also, in this example the fourth reference value K4 is set by NC circuit 50 to equal 4. As shown in FIGS. 7(c) and 7(d), the comparator 30c outputs a high level signal S15 each time the count of pulses from AND gate 30a exceeds 1 (K3). Comparator 30g then generates a high level ARC STOP signal after comparator 30c generates more than four (K4) high level signals S15. The ARC STOP signal is supplied to the NC circuit 50 through OR gate 9 in order to stop the machining operation.

Figure 8:
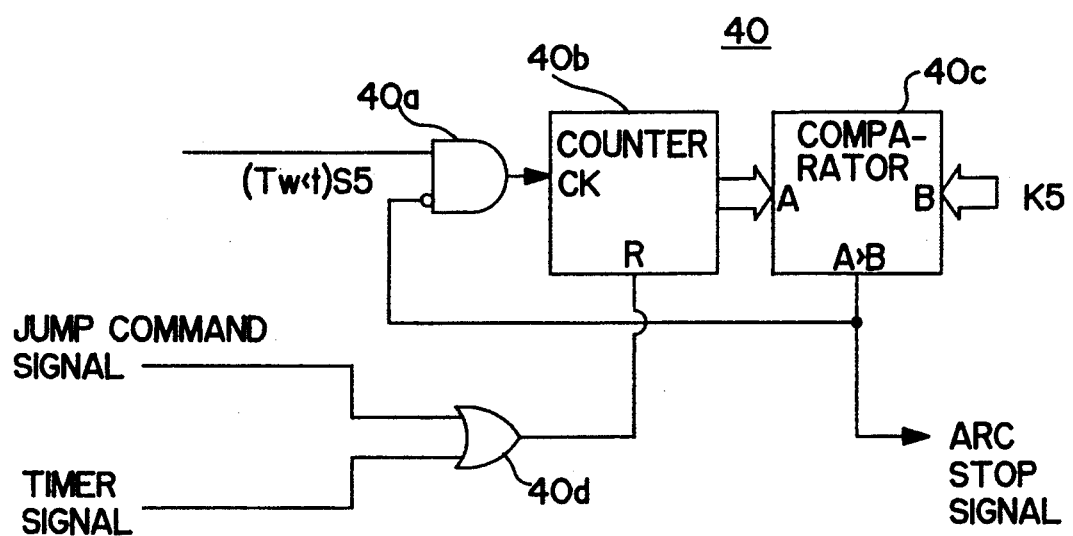
FIG. 8 is a block diagram of a second carbide formation detector for the embodiment of FIG. 7.

As shown in FIG. 8, the second carbide formation detector 40 may comprise an AND gate 40a which receives the infinitesimal discharge waiting time signal S5. The output of AND gate 40a is supplied to the clock input CK of a counter 40b. The counter 40b has its reset terminal connected to the output of OR gate 40d so that the counter becomes reset whenever either the jump command signal or the timer signal goes high. The output of counter 40b is connected to an A input terminal of a comparator 40c, which receives a fifth reference value K5 from NC circuit 50 at its B input terminal.

When the count exceeds the fifth reference value K5, the comparator generates a high level ARC STOP signal in order to stop the machining operation. The output of comparator 40c is supplied to an inverted input of AND gate 40a. Thus, when the count exceeds the fifth reference value K5, the ARC STOP signal goes high and prevents the passage of the infinitesimal discharge waiting time signal S5 to the counter 40b.

Figure 9:
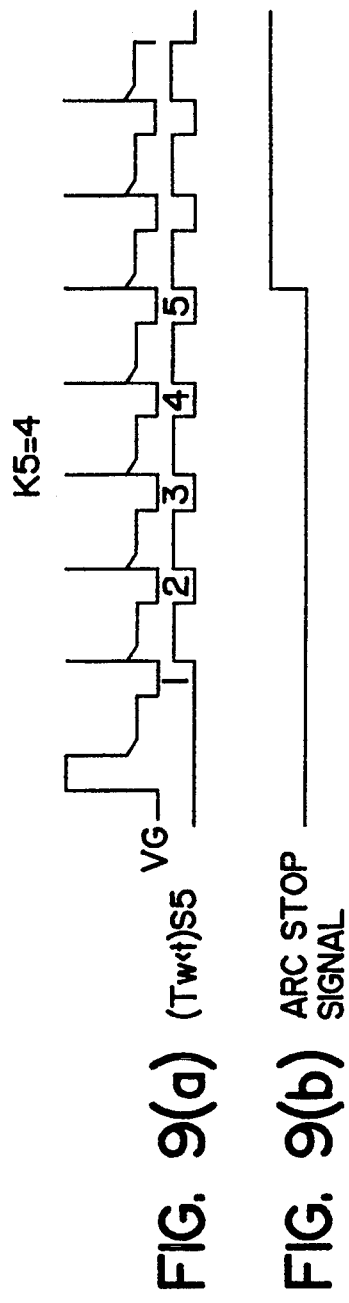
FIGS. 9(a) and 9(b) are a timing chart for the second carbide formation detector of FIG. 8.

As shown in the example of FIGS. 9(a) and 9(b), each time the discharge waiting time period Tw is less than the reference time period t, an infinitesimal discharge waiting time signal S5 is generated. With K5 equal to 4, the comparator 40c will generate a high level ARC STOP signal when the count of the infinitesimal discharge waiting time signals S5 exceeds 4. The high level ARC STOP signal is then supplied to the NC circuit 50 through OR gate 9 in order to stop the machining process.

Figure 10:
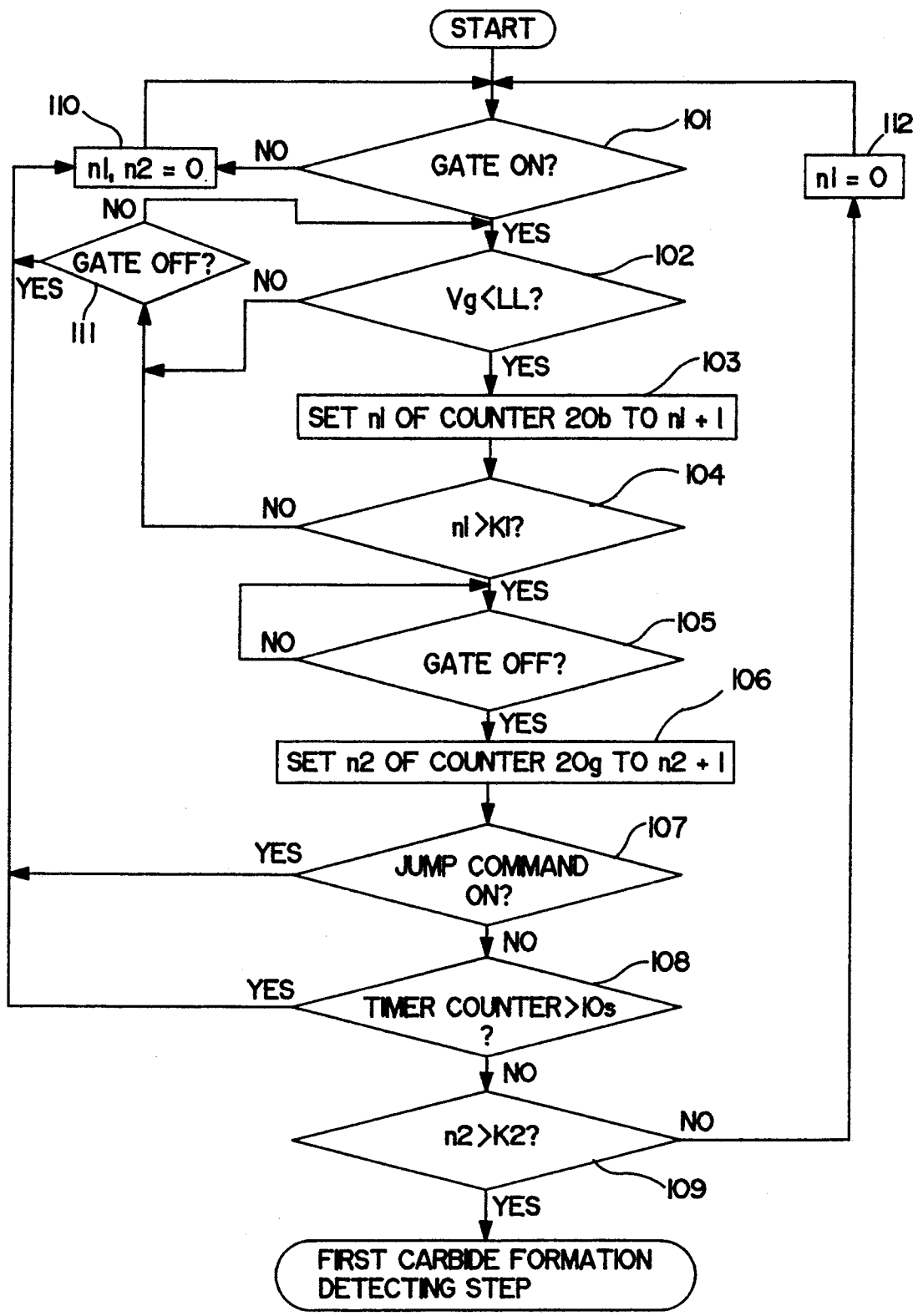
FIG. 10 is a flow chart for the operations of the precursor phenomenon detector.

The method performed by the first carbide formation detector 30, as shown in FIG. 10, first determines whether electric discharge machining is in progress at step S101 by checking if the gate is ON. If the electric discharge machining is not in progress, the count values n1 and n2 for counters 20b and 20g respectively are set to 0 at step 110 and the method loops back to step 101.

With electric discharge machining in progress, the method proceeds to step 102 where the gap voltage $V_G$ is compared with the lower voltage level LL. If the gap voltage $V_G$ is less than the lower level LL, the count value n1 is incremented by 1 at step 103. Otherwise, the method loops back to step 102 as long as the gate is ON at step 111.

After incrementing the count value n1 at step 103, the count value n1 is compared with the first reference value K1. As long as the count value n1 is not greater than K1 and the gate is ON at step 111, the method loops back to step 102. Once the count value n1 exceeds K1 and the gate is OFF at step 105, the count value n2 of counter 20g is then incremented by 1.

If a jump command is not ON at step 107 and the timer count is not greater than 10s at step 108, then the count value n2 is compared with the second reference value K2. As long as the count value n2 is less than the second reference value K2, the count value n1 is reset to 0 and the process begins again at step 101. If a jump command is ON at step 107, the timer count exceeds 10s at step 108, or if the gate is OFF at step 111, then the method restarts at step 101 with both counts values n1 and n2 being reset to 0 at step 110.

Figure 11:
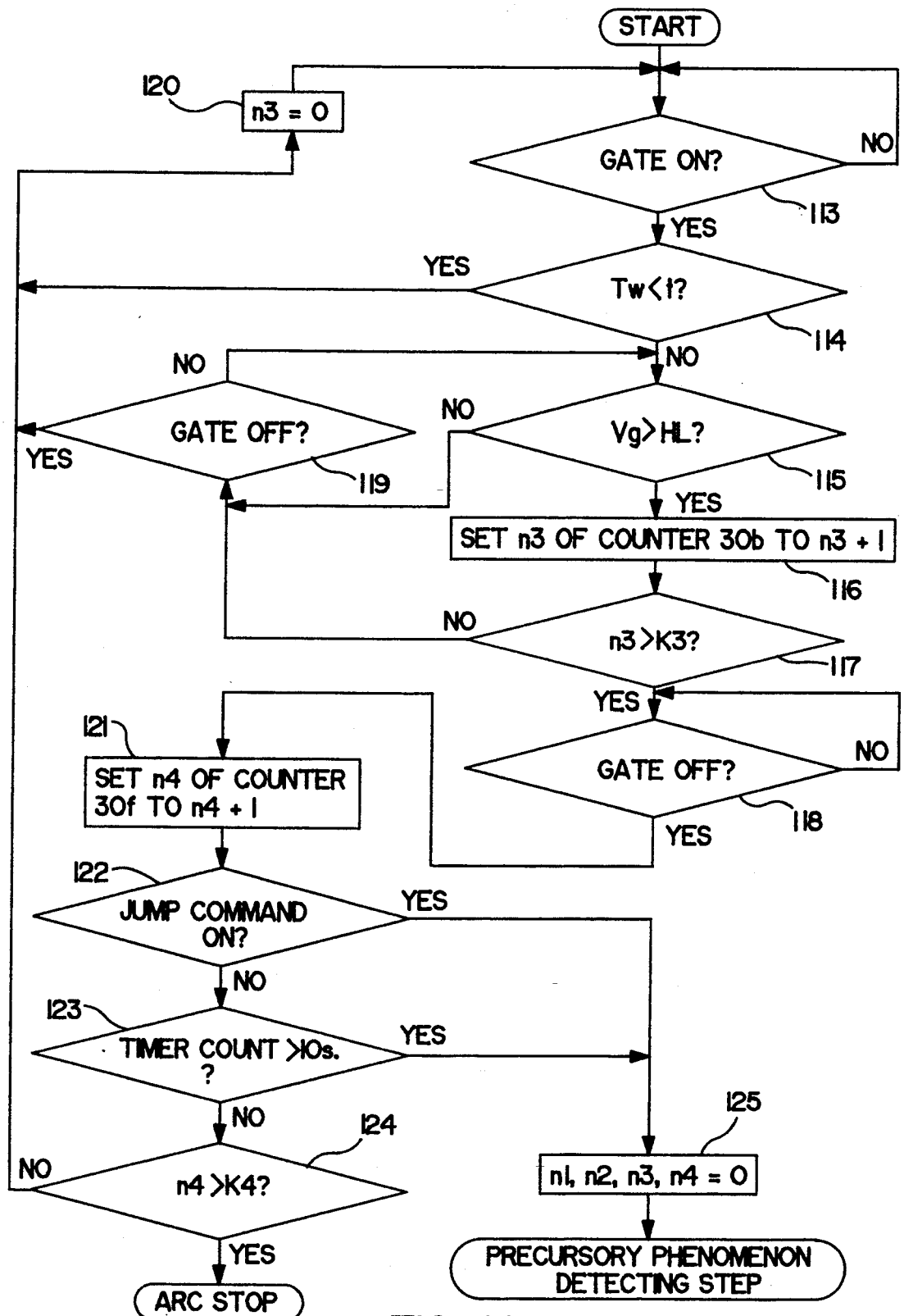
FIG. 11 is a flow chart for the operations of the first carbide formation detector.

When the count value n2 exceeds the second reference value K2 at step 109, the process proceeds to the first carbide formation detecting step of the method of FIG. 11. As shown in FIG. 11, after the gate is determined to be ON at step 113, the discharge waiting time Tw is compared with the reference time period t. As long as the discharge waiting time period Tw is less than the reference time period t, a count value n3 for counter 30b is reset to 0 at step 120 and the method restarts at step 113.

When the discharge waiting time period Tw is not less than the reference time period t, the gap voltage $V_G$ is compared with a higher voltage level HL. As long as the gap voltage $V_G$ is not greater than the higher level HL and the gate is not OFF, the method repeats steps 115 and 119. Once the gap voltage $V_G$ exceeds the higher level HL, the count value n3 is incremented by 1 at step 116 and compared to the third reference value K3 at step 117. If the count value n3 is not greater than K3 at step 117 and the gate is not OFF at step 119, then the method loops back to step 115. If the gate is determined to be OFF at step 119, then the count value n3 is reset to 0 at step 120 and the method restarts at step 113.

Once the count value n3 exceeds the reference value K3 and the gate is OFF at step 118, a count value n4 for counter 30f is incremented by 1 at step 121. If the jump command becomes ON at step 122 or the timer count exceeds 10s at step 123, then the counts values n1, n2, n3, and n4 are reset to 0 at step 125 and the method reverts back to the precursor phenomenon detecting method of FIG. 10.

When the jump command is OFF at step 122 and the 10 timer count does not exceed 10s at step 123, then the count value n4 is compared to the fourth reference value K4. If the count value n4 is not greater than the fourth reference value K4, the count value n3 is reset to 0 at step 120 and the method restarts at step 113. If, however, the count n4 does exceed K4, then a high level ARC STOP signal is generated and supplied to the NC circuit 50 through OR gate 9 for halting the machining operation.

Figure 12:
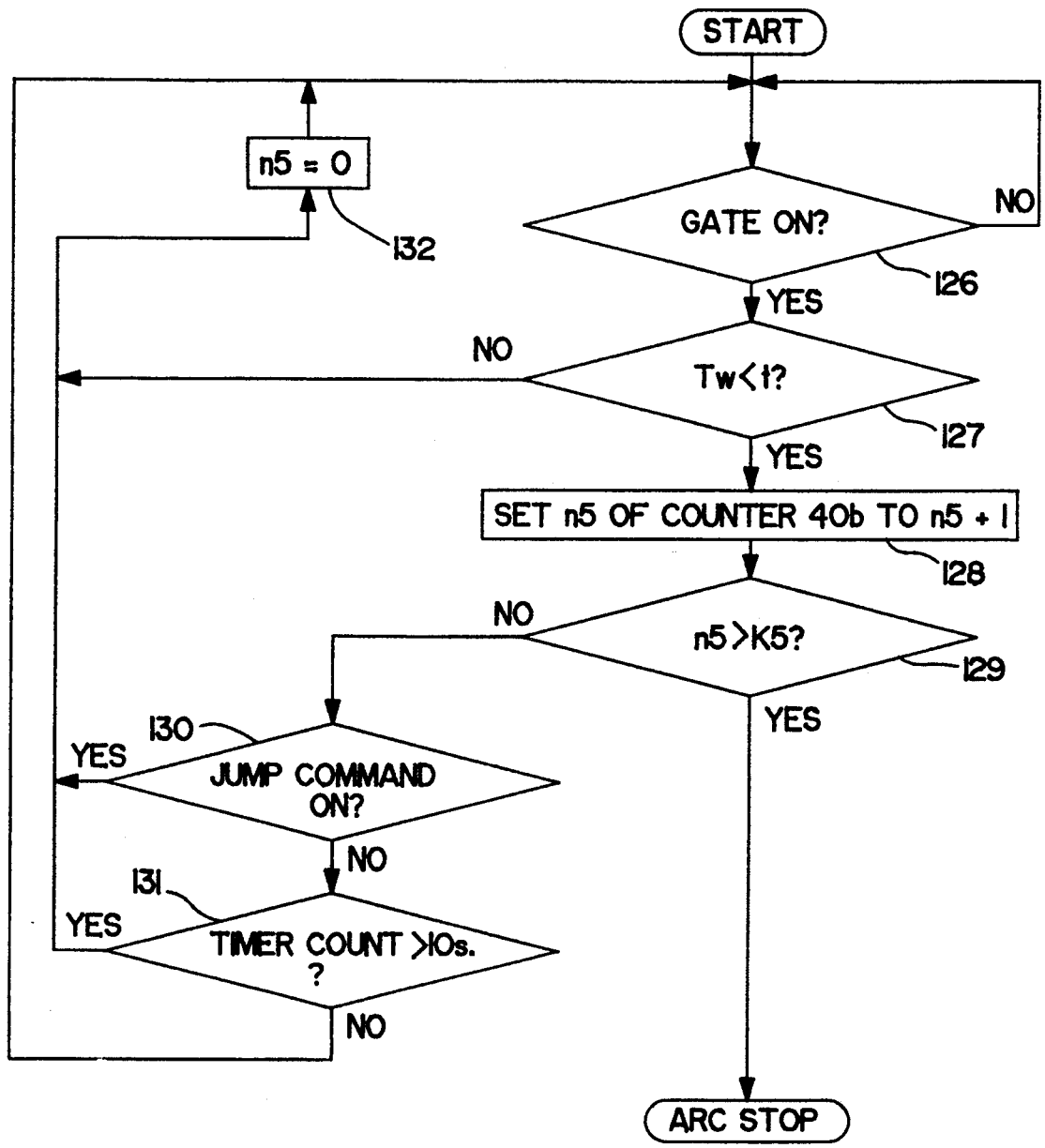
FIG. 12 is a flow chart for the operations of the second carbide formation detector.

The method of the second carbide formation detector, as shown in FIG. 12, first determines whether the gate is ON at step 126. With the gate ON, the discharge waiting time Tw is compared with the reference time period t at step 127. If the discharge waiting time Tw is not greater than the time period t, a count n5 for counter 40b is reset to 0 at step 132 and the method restarts at step 126.

When the discharge waiting time Tw is greater than the reference time period t, the count n5 of counter 40b is incremented at step 128 and compared to the fifth reference value K5 at step 129. With the count n5 not greater than K5 and with neither a jump command being ON at step 130 nor a timer count being greater than 10s at step 131, the method reverts back to step 126. If, however, either the jump command is ON or the timer count is greater than 10s, then the count value n5 is reset to 0 at step 132 and the method restarts at step 126. If the count n5 does exceed reference value K5 at step 129, then a high level ARC STOP signal is generated and supplied to the NC circuit 50 through OR gate 9 for halting the machining operation.

The embodiment was chosen and described in order to best explain the principles of the invention and its practical application to thereby enable others skilled in the art to best utilize the invention in various embodiments and with various modifications as are suited to the particular use contemplated. It is intended that the scope of the invention only be limited by the claims appended hereto.

We claim:

1. An electric discharge machining apparatus having an electrode comprising:
    a power supply means for supplying a succession of electrical pulses to produce a discharge across a gap formed between the electrode and a workpiece;
    a gap voltage sensing means for sensing a voltage across said gap and outputting a signal representative of said gap voltage;
    a discharge detecting means for comparing a discharge waiting time with a reference time value, said discharge waiting time being determined according to said signal from the gap voltage sensing means;
    a precursor phenomenon detecting means for generating an output signal when a first signal, output by the discharge detecting means when the signal from the gap voltage sensing means is less than a first reference level during a discharge produced by one of said pulses, is present for a predetermined number of pulses;
    a first carbide formation detecting means for generating a signal for cutting off said electrical pulses in response to the output signal from said precursor phenomenon detecting means when a count of a second signal, output by the discharge detecting means when the signal from the gap voltage sensing means is greater than a second reference level during a discharge produced by one of said pulses, exceeds a predetermined count; and
    a second carbide formation detecting means for counting discharge voltage pulses having a discharge waiting time less than said reference time value and for generating a signal for cutting off said supply of electrical pulses when the value of said count reaches a predetermined value.

2. The apparatus according to claim 1, wherein said gap voltage sensing means comprises a voltage divider circuit connected across the gap and wherein said signal comprises a voltage proportional to the voltage across the gap.

3. The apparatus according to claim 1, wherein said discharge detecting means includes means for comparing said signal with said first reference level for producing said first signal indicative of the discharge voltage level.

4. The apparatus according to claim 3, wherein said discharge detecting means further includes means for comparing said signal with said second reference level for producing said second signal indicative of the discharge voltage level.

5. The apparatus according to claim 1, wherein said discharge detecting means further includes means for comparing said signal with a third reference level for producing a signal indicative of the discharge waiting time.

6. The apparatus according to claim 1, wherein said discharge detecting means is further operable for outputting a signal whenever the discharge waiting time is less than said reference time value.

7. The apparatus according to claim 1, wherein said first signal comprises a clock signal and said precursor phenomenon detecting means further comprises means for comparing said clock signal with a reference value and for outputting a count signal when said clock signal exceeds said reference value during a discharge.

8. The apparatus according to claim 7, wherein said precursor phenomenon detector further comprises a second means for comparing said count signal with a predetermined reference number and for outputting said signal when the number of count signals exceeds said predetermined reference number.

9. An electrical discharge machining apparatus having a power supply for supplying a succession of voltage pulses to a machining gap formed between the tool electrode and a workpiece electrode for causing electrical discharges therebetween, comprising:
    means for generating a signal representative of the voltage across the machining gap;
    means responsive to said machining gap signal for generating:
        a) a first signal indicative of when a discharge voltage is less than a first predetermined level;
        b) a second signal indicative of when a discharge voltage exceeds a second predetermined level; and
        c) a third signal indicative of when a discharge waiting time is less than a predetermined value;
    a first carbide formation detector, responsive to said first signal and said second signal for cutting off said pulses when the discharge voltage is below said first predetermined level for a predetermined number of pulses and then above said second predetermined level for a predetermined number of pulses;
    a second carbide formation detector, responsive to said third signal for cutting off said pulses when the discharge waiting time is less than said predetermined value for a predetermined number of pulses.

10. A method of controlling an electric discharge machine to prevent concentrated and continuous arc discharges, said machine having a power supply for supplying a succession of voltage pulses to a machining gap formed between a tool electrode and a workpiece electrode to generate discharges therebetween, said method comprising the steps of:
- monitoring the voltage across the machining gap;
- generating a first signal when the gap voltage is less than a first predetermined level during a discharge for a first predetermined number of pulses;
- generating a second signal when the gap voltage is greater than a second predetermined level during a discharge;
- generating a third signal when the discharge waiting time is less than a reference time period;
- cutting off the supply of voltage pulses to the machining gap when the first signal is present and then the second signal is present for a second predetermined number of pulses; and
- cutting off the supply of voltage pulses to the machining gap when the third signal is present for more than a third predetermined number of pulses.

* * * * *